United States Patent [19]

Takano et al.

[11] Patent Number: 5,256,856
[45] Date of Patent: Oct. 26, 1993

[54] WELDING METHOD FOR ALUMINUM ALLOYS

[75] Inventors: Hideaki Takano; Jitsuo Nakata, both of Wakayama; Yuji Nakahara, Kainan; Keizoh Nanba, Nagoya; Yoshihiko Sugiyama, Kasugai, all of Japan

[73] Assignees: Kyodo Oxygen Co., Ltd.; Sumitomo Light Metal Industries, Ltd., Japan

[21] Appl. No.: 869,463

[22] Filed: Apr. 15, 1992

[30] Foreign Application Priority Data

Apr. 15, 1991 [JP] Japan .................... 3-111096

[51] Int. Cl.$^5$ .................................. B23K 9/173
[52] U.S. Cl. .................................. 219/137 WM
[58] Field of Search ............... 219/74, 137.2, 137 R, 219/72, 137 WM

[56] References Cited

U.S. PATENT DOCUMENTS 2,681,970 6/1954 Koopman ............... 219/74

FOREIGN PATENT DOCUMENTS 37-811 10/1959 Japan ..................... 219/74
52-56036 5/1977 Japan ................ 219/137 R
54-50443 4/1979 Japan ..................... 219/72
2-117777 5/1990 Japan .............. 219/137 WM

OTHER PUBLICATIONS

Japanese Industrial Standard "Aluminium and Aluminium Alloy Welding Rods ans Wires" pp. 1-15 (1986).
Japanese Industrial Standard "Aluminium and Aluminium Alloy Sheets and Plates, Strips and Coiled Sheets" pp. 697-837 (1988).

Primary Examiner—Clifford C. Shaw
Attorney, Agent, or Firm—Wall and Roehrig

[57] ABSTRACT

This invention involves a MIG welding method for aluminum alloys to prevent the formation and deposition of black powder on or around the weldment's bead. By using pure aluminum wire or aluminum alloy wire containing less than 2.5 wt% the base of alloying components as the consumable electrode wire and using aluminum alloy wire as the filler wire 3, the consumable electrode wire 2 and the filler wire 3 are fed into the a metal bath under a certain weight ratio, so that the alloy composition of the molten metal bath is equivalent to that of the base of the black powder on the both sides of the weldment's bead can be is avoided.

8 Claims, 3 Drawing Sheets

WELDING METHOD FOR ALUMINUM ALLOYS

BACKGROUND OF THE INVENTION

This invention relates to a welding method of aluminum alloys to prevent a formation and contamination of black or dark gray or brown particulate substances (hereafter called as a black powder) around or on the weldment bead during an electrode-type inert gas arc welding (hereafter called as a MIG welding) of aluminum alloys.

Demands for aluminum alloys are ever-growing in various industrial sectors including the aerospace motor-vehicles, chemical vessels and containers, constructions, electric machineries and other industries due to their light weight, excellent corrosion resistance, high heat and electric conductivities, and high specific strength (that is, high ratio of strength-to-weight).

Numerous aluminum alloy components utilized and constructed in the aforementioned industries are assembled by either welding, soldering or mechanical assembling. By welding of these components, the MIG welding or non-electrode-type inert gas arc welding (hereafter cited as a TIG welding) are principally employed. Since MIG welding shows relatively higher arc efficiency than the TIG welding, and is generally characterized by high welding speeds, it is utilized for welding plate/sheet materials in a wide range of plate thicknesses.

Where using the MIG technique to weld aluminum alloys, it is occasionally noticed that black powder is formed around the weldment bead or on the bead surface itself, depending upon the type of base material being welded, the welding wire, being used and other welding conditions. Although the black powder is not, in general, considered a weld defect such as weld cracks or pits, the black powder normally spoils the appearance of weldments.

Hence, care is usually taken to minimize the formation and contamination of the black powder by an appropriate selection of various welding conditions including torch angle, arc voltage, the shape and inner diameter of the shield nozzle, the distance between the nozzle base portion and the base material and the flow rate of the shield gas.

The black powder formed during the MIG welding of aluminum alloys can also cause problems when post-welding treatment are needed such as a surface treatment or painting. Therefore, prior to these post-welding treatments, the black powder is removed by mechanical means such as by brushing, or sometimes by chemical or other physical methods.

Black powder seems to form easily and in greater amount when a Mg-bearing (as a main alloying element) 5000-series aluminum alloy or a Zn-, Mg-bearing (as main alloying elements) 7000-series aluminum alloy according to JIS H 4000 "Aluminum and Aluminum Alloy Plate and Bar" is welded by using alloy wire made of 5000-series aluminum alloy according to JIS Z 3232 "Aluminum and Aluminum Alloy Welding Bar and Wire."

Although black powder appears to be very fine particles by a macroscopic observation, a microscopic observation shows that it is composed of very-fine spherical particles consisting of nearly pure aluminum, and alloying elements such as Mg, Zn, Si (depending upon the type of welding wire) and Oxygen deposited over pure aluminum spherical particles.

It is recognized that the amount of the black powder deposited is removed by the following welding conditions; namely, by an increased angle welding, a low arc voltage, a large inner diameter of the shield nozzle, and a short distance between the nozzle base portion and the base material to be welded.

OBJECTS AND SUMMARY OF THE INVENTION

It is, therefore, an object of the present invention to provide a welding method for aluminum alloys for preventing the formation or depositing of black powder around or on a weldment bead during the MIG welding of aluminum alloys. It has been observed that (1) the formation of black powder is related to the type of weld base material and welding wire used, and (2) that MIG welding produces more black powder than the TIG welding. Experiments were carried out, under the welding conditions described in the Tokugan-Hei 2-98513 applied by the present applicants, to prevent the formation of the black powder using various combinations of consumable electrode wires and filler wires. The experiments were conducted by inserting two wires into the shield nozzle to generate an arc by the consumable electrode wire, and by inserting the filler wire into the molten metal bath to separate a portion of the welding current passing from the consumable electrode wire to the arc. Guiding it to the filler wire, and combining it at the ground terminal of the welding electricity supply. All procedures are to perform a consumable electrode-type arc welding.

From the results obtained, it was found that, when a consumable electrode wire containing Mg, Zn, Si, or Cu (which are alloying elements of consumable electrode wire) used individually or in continuation, alloying element vapor transferring from the consumable electrode wire to the base material is deviated from an inert gas shield zone to react with the air, resulting in the formation of black powder. The amount of black powder formed during MIG welding depends strongly upon alloying elements of the consumable electrode wire rather than the base material.

The present invention entitles a pure aluminum wire as a consumable electrode and an aluminum alloy wire whose chemical exceeds that of the base material as a filler. During welding of an aluminum alloy using the gas shield arc welding technique, the consumable electrode is used to generate an arc and produce a molten bath in the base material. The filler wire is feed into the bath to produce a bath having the appropriate composition as that of the base material.

Moreover, the present invention provides also that the consumable electrode wire and the filler wire combine in such a way that the chemical compositions of alloying elements in the molten metal bath are equivalent to those of the base material by employing aluminum alloy wire having less than 2.5 weight percent (wt%) of alloying elements as the consumable electrode wire and aluminum alloy wire (whose chemical alloying compositions are more than those of the base material) as the filler wire.

According to the present invention, since pure aluminum or the consumable electrode wire composed of pure aluminum or aluminum alloy with alloying elements less than 2.5 wt% is used, the vapor transferring from the consumable electrode wire to the base material should be pure aluminum or aluminum alloy with alloying elements less than 2.5 wt%. Therefore, alloying elements are not included in the vapor; or, if any, are in low concentration, resulting in a successful prevention of formation of black powder. Furthermore, an aluminum alloy filler wire whose chemical alloying composition is higher than that of the base material is inserted in the molten metal bath produced by the consumable electrode wire, and the consumable electrode wire and the filler wire combine to produce a chemical compositions of alloying elements in both the molten metal bath that is substantially equal to that of the base material, so that any quality degradation of reduction in weldment's strength due to a dilution of alloying element in the weldments (which might be occurred in the weldments of aluminum alloys by using pure aluminum wire) is avoided.

Although the inserting position of the filler wire to the molten bath may be either from the front side or the back side of the consumable electrode wire, it is preferable to insert it close to the arc and to agitate the molten bath by oscillating the filler wire to enhance the diffusion process.

The results of investigating the amount of alloying elements of the molten aluminum alloy base material and aluminum alloy filler wire consumed in the molten bath indicated that there is no significant consumption of alloying elements. Hence, the supplying weight ratio of the inserting aluminum alloy filler wire to the consumable electrode wire made of pure aluminum or aluminum alloy with less than 2.5% by wt. of alloying compositions should be controlled so that the weld has the same chemical compositions as the base material.

To produce this result the filler wire should be aluminum alloy which includes alloying elements in greater amounts than those of the base material.

The main reason why the composition of the consumable electrode wire is limited to either pure aluminum or aluminum alloy with less than 2.5% by wt. of alloying compositions is based on the fact that the formation of the black powder will become significantly when it exceeds 2.5% by wt.

FIG. 1 shows a main portion of the MIG welding apparatus according to this invention FIG. 2 shows a butt weldment according to an embodiment of this invention, FIGS. 3(a) and 3(b) illustrate how the black powder is formed on and around the weldment beads according to the embodiment 1; where (a) illustrates the case of the present invention and (b) illustrates the case of a more conventional method, and FIGS. 4(a)–4(c) show the formation of the black powder on or around the weldment beads according to other embodiments of this invention; where (a) is the case of a second embodiment, (b) is the case of another embodiment and (c) is the case of the comparison test (2); whereby 1 ... nozzle,
2 ... consumable electrode wire,
3 ... filler wire,
4 ... base material to be welded,
5 ... arc,
6 ... molten metal bath,
7 ... weld metal,
8 ... weld bead, and

DETAILED DESCRIPTION OF THE INVENTION

The above and many other objects, features and advantages of this invention will be made fully understood from the ensuing detailed description of the preferred embodiments of the present invention, which description should be read in conjunction with the accompanying drawings and tables.

Figure 1:
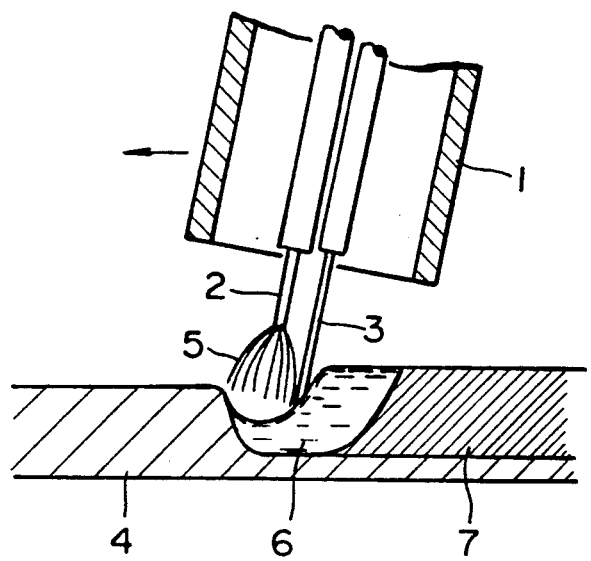

FIG. 1, illustrates a welding apparatus of an embodiment according to this invention. The consumable electrode wire 2 is made of either pure aluminum or aluminum alloy containing less than 2.5 by wt. of alloying compositions which project from the nozzle 1 of the MIG welding apparatus. An arc 5 is generated between the base material 4 and the consumable electrode wire 2. A filler wire 3 is supplied to the molten metal bath 5 produced on the base material 4. The supplying weight ratio of the consumable electrode wire 2 and filler wire 3 should be controlled so that the alloying compositions of both the molten metal bath and the base material 4 are substantially the same. The weld metal is indicated by number 7.

In order to achieve an equal amount of alloying compositions in the bath formed by the consumable electrode wire 2 and the filler wire 3 to that of the base material 4, a feeding speed of the aluminum alloy filler wire 3 and the feeding speed of the consumable electrode wire 2 made of either pure aluminum or aluminum alloy with less than 2.5% by wt. of alloying compositions should be controlled according to the alloying compositions of the filler wire. Alternatively, under the same feeding speeds, it can be done by controlling the amount of alloying compositions in the filler wire 3. In this case, the supplying speed of each wire is limited by the plate thickness, the composition of the base material 4, and the wire diameter.

Embodiment 1

Figure 2:
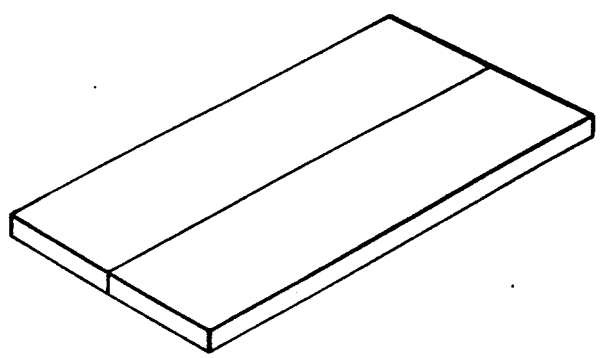

By using the materials listed in Table 1, and welding apparatus shown in FIG. 1, the butt weldment with I-shaped beveling of 3 mm thick plate (see FIG. 2) were welded by the MIG welding technique under welding conditions listed in Table 2. The welding conditions of the conventional MIG welding technique are also listed for comparison. The chemical compositions of the weld metal were measured by a spectroscopy. The conditions of appearance of the black powder were examined by naked eyes. The results are listed in Table 3 and shown in FIG. 3(a) and (b). Argon gas was utilized as a shield gas. Diameter of consumable electrode wire and the filler wire was 1.2 mm.

TABLE 1

| test materials | Chemical Composition (% by wt.) | | | | | | | | |
|---|---|---|---|---|---|---|---|---|---|
| | SI | Fe | Cu | Mn | Mg | Cr | Zn | Ti | Al |
| base materials | 0.14 | 0.18 | 0.03 | 0.69 | 4.44 | 0.22 | 0.05 | 0.01 | bal |
| consumable electrode wire 1 | 0.11 | 0.19 | 0.05 | — | — | — | — | — | bal |
| consumable electrode wire 2 | 0.18 | 0.29 | 0.06 | 0.74 | 4.79 | 0.09 | 0.05 | 0.01 | bal |

TABLE 1-continued

| test materials | Chemical Composition (% by wt.) | | | | | | | | |
|---|---|---|---|---|---|---|---|---|---|
| | SI | Fe | Cu | Mn | Mg | Cr | Zn | Ti | Al |
| filler wire 1 | 0.17 | 0.19 | 0.07 | 1.44 | 9.40 | 0.83 | 0.06 | 0.01 | bal |

Note:
consumable electrode wire 1: used for this invention (1)
consumable electrode wire 2: used for comparison test (1)
filler wire 1: used for this invention (1)

TABLE 2

| | weld voltage | arc voltage | welding speed | filler wire amount |
|---|---|---|---|---|
| this invention (1) | 240 V | 26 V | 200 cm/min | 8.5 g/min. |
| comparison (1) | 240 V | 26 V | 100 cm/min | — |

TABLE 3

| | chemical composition of weld metal (% by wt.) | | | | | | | | | BLACK POWDER |
|---|---|---|---|---|---|---|---|---|---|---|
| | Si | Fe | Cu | Mn | Mg | Cr | Zn | Ti | Al | |
| this invention (1) | 0.12 | 0.19 | 0.05 | 0.68 | 4.00 | 0.20 | 0.01 | 0.01 | bal | absence |
| comparison (1) | 0.14 | 0.20 | 0.05 | 0.70 | 4.42 | 0.20 | 0.05 | 0.05 | bal | presence |

Figure 3A:
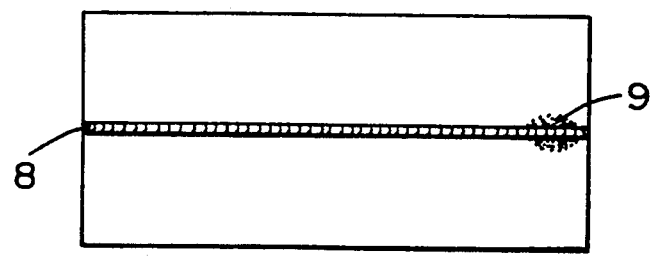
Figure 3B:
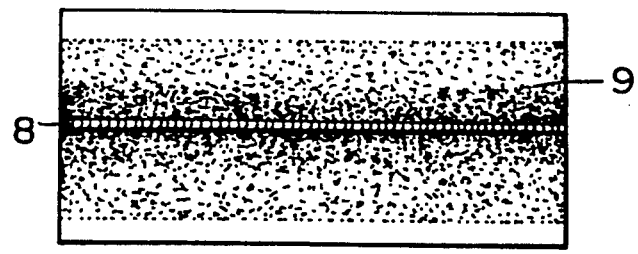

As seen in Table 3 and FIG. 3(a) according to embodiment (1) of this invention, it was found that contamination of black powder 9 on or around the surface of the weldment bead 8 was absent, and the chemical composition of the weld metal were very similar to that of the base material. In contrast, by the MIG welding during the comparison test (1), in FIG. 3 the entire surface of the weldment about bead 8 was covered with the black powder 9. This is totally different from the case of this invention.

Mechanical tests were conducted on the weldments, machined according to JIS Z 3132. The results are listed in Table 4.

TABLE 4

| | tensile strength (kgf/mm²) | yield strength (kgf/mm²) | elongation (%) |
|---|---|---|---|
| this invention (1) | 32.3 | 15.4 | 16 |
| comparison (1) | 32.0 | 15.2 | 16 |

As seen in Table 4, all of tensile strength, yield strength and elongation of test pieces machined from weldments according to embodiment (1) of the invention are equivalent to those of weldments by the comparison test (1).

Embodiment 2

By using the same base material employed in the previous embodiment 1, and materials listed in Table 5, the butt weldment with the I-shaped beveling of 3 mm thick plate (see FIG. 2) was carried out by using the welding apparatus seen in FIG. 1. Welding conditions were MIG welding, as listed in Table 2, which are the same as for the embodiment (1). Both eye-observation on the formation of the black powder and spectroscopic analysis of alloying compositions were conducted on weld metals.

TABLE 5

| test material | chemical composition (% by wt.) | | | | | | | | |
|---|---|---|---|---|---|---|---|---|---|
| | Si | Fe | Cu | Mn | Mg | Cr | Zn | Ti | Al |
| consumable electrode wire (3) | 0.08 | 0.17 | 0.04 | — | 1.66 | — | — | — | bal |
| consumable electrode wire (4) | 0.12 | 0.22 | 0.04 | — | 2.05 | — | — | — | bal |
| consumable electrode wire (5) | 0.10 | 0.20 | 0.04 | — | 2.55 | — | — | — | bal |
| filler wire (2) | 0.17 | 0.19 | 0.07 | 1.38 | 8.20 | 0.83 | 0.06 | 0.01 | bal |

Note:
consumable electrode wire 3: used for this invention (2)
consumable electrode wire 4: used for this invention (3)
consumable electrode wire 5: used for comparison test (2)
filler wire 2: used for this invention (2), (3), and a comparison test (2)

Figure 4A:
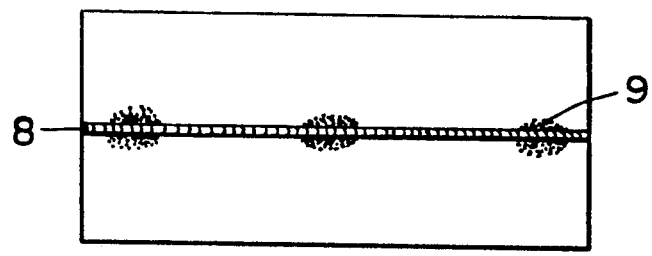
Figure 4B:
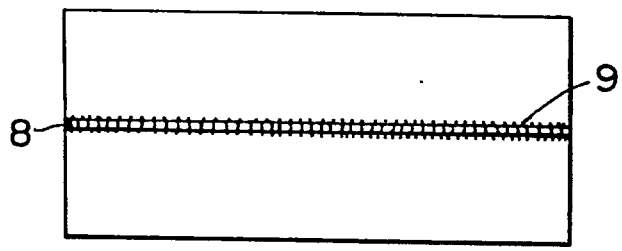

The results are listed in Table 6 and shown in FIG. 4(a) and (b). the shield gas was argon gas. Diameter of the consumable electrode wire 3, 4 and the filler wire 2 was 1.2 mm.

TABLE 6

| | chemical composition of weld metal (% by wt.) | | | | | | | | | BLACK POWDER |
|---|---|---|---|---|---|---|---|---|---|---|
| | Si | Fe | Cu | Mn | Mg | Cr | Zn | Ti | Al | |
| this invention (2) | 0.11 | 0.18 | 0.05 | 0.66 | 4.00 | 0.19 | 0.01 | 0.00 | bal | absence |
| this invention (3) | 0.11 | 0.18 | 0.05 | 0.67 | 4.25 | 0.19 | 0.01 | 0.00 | bal | absence |
| comparison (2) | 0.13 | 0.19 | 0.05 | 0.69 | 4.35 | 0.21 | 0.01 | 0.00 | bal | presence |

Figure 4C:
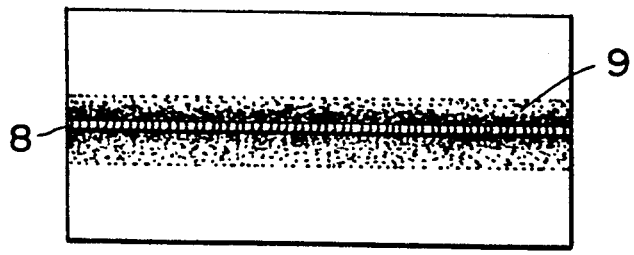

As seen in Table 6 and FIG. 4(a) and (b), no contamination of black powder 9 was observed on or around the weld bead 8 formed by the second (2) and third (3) embodiments of the invention, using the consumable electrode wire having less than 2.5% by wt. of alloying compositions. The chemical alloy composition of the weld metal was found also to be equivalent to those of base material. On the other hand, by the comparison test (2) in which the alloying composition of the consumable electrode wire exceeded 2.5% by wt., black powder 9 was deposited on both sides of the weld beads 8, as illustrated in FIG. 4(c). This result is totally different from those obtained from this invention (2) and (3).

Tensile tests on test pieces made from weldments, machined according to JIS Z 3121, were conducted. The results are listed in Table 7. As seen in Table 7, mechanical properties of tensile strength, yield strength and elongation of weldments formed by embodiments (2) and (3) are equivalent to those of weldment by the comparison test (2).

TABLE 7

|  | tensile strength (kgf/mm$^2$) | yield strength (kgf/mm$^2$) | elongation (%) |
| --- | --- | --- | --- |
| this invention (2) | 32.1 | 15.3 | 16 |
| this invention (3) | 32.3 | 15.3 | 16 |
| comparison (2) | 32.5 | 15.4 | 15 |

As have been described, this invention prevents the formation and deposition of black powder on or around the weld bead formed during MIG welding of aluminum alloys. Moreover, the strength of the weld is equivalent to base material strength and is maintained by controlling the chemical compositions of the weld metal. Hence, this invention offers a remarkable reduction in post-welding procedures for parts which require painting after the welding assembly process.

What is claimed is:

1. A method of producing an arc weld in an aluminum base metal containing alloying materials that includes the steps of providing a consumable electrode wire being formed of pure aluminum, striking an arc between the consumable electrode and the base metal to produce a molten bath of metal on said base materials providing a filler wire containing aluminum and the alloy materials contained in the base metal, the amount of alloy materials in the filler wire being greater in percentage by weight than that contained in the base material, inserting the filler wire into the molten bath to form a bath material of aluminum having the same percentage by weight of alloy materials as the base material.

2. The method of claim 1 wherein the alloy material in the base metal are selected from the groups comprising silicon, iron, copper, manganese, magnesium, titanium, zirconium, lithium, chromium and zinc.

3. The method of claim 2 wherein the base material and the filler wire contain all of the materials in the group and producing the weld at a speed of about 200 cm/min and consuming fuller wire of about 8.5 g/min.

4. The method of claim 2, wherein said base metal contains at least 3% by weight of magnesium.

5. A method of producing an arc weld in an aluminum base metal containing alloying material that includes the steps of:
providing a consumable electrode being formed by aluminum-based alloy containing less tan 2.5% by weight of alloying materials;
striking an arc between the consumable electrode and the base metal to produce a molten bath of metal on said base metal;
providing a filler wire containing aluminum and the alloying materials contained in the base metal, the amount of alloying materials in eh filler wire being greater in percentage by weight than that of said alloying materials contained in the base metal;
inserting the filler wire into the molten bath to provide a chemical composition in a weld having a weight percentage of aluminum which is substantial equal to the weight percentage of aluminum in the basemetal.

6. The method of claim 5 wherein said consumable electrode wire is formed of an aluminum-based alloy containing less than 0.5% by weight of said alloying materials.

7. The method of claim 5 wherein said consumable electrode wire is formed of said aluminum-based alloy containing less than 1.5% by weigh of said alloying material.

8. The method of claim 5, wherein said alloying material in aid consumable electrode is comprised of at least one member selected from the group consisting of silicon, iron, copper, manganese, magnesium, chromium, zirconium, lithium, zinc and titanium.

* * * * *